Aug. 13, 1957 R. A. HAYES 2,802,808

COMPOSITIONS OF A STYRENE-ACRYLONITRILE RESIN, A GRAFT OF STYRENE AND ACRYLONITRILE UPON A DIENE RUBBER AND A DIENE RUBBER

Filed July 31, 1953 3 Sheets-Sheet 1

INVENTOR.
ROBERT A. HAYES
BY W. A. Fraser

COMPOSITIONS OF A STYRENE-ACRYLONITRILE RESIN, A GRAFT OF STYRENE AND ACRYLONITRILE UPON A DIENE RUBBER AND A DIENE RUBBER

Filed July 31, 1953 3 Sheets-Sheet 2

TABLE I

| PROPORTIONS OF CONSTITUENTS (%) | | | PROPERTIES OF THE COMPOSITIONS | | | | | | | | | ITEM |
|---|---|---|---|---|---|---|---|---|---|---|---|---|
| | | | | | | | IMPACT STRENGTH AT | | | | | |
| Resin | Graft Co-polymer | Butadiene Styrene Copolymer | Hardness (Rockwell R) | Heat Distortion temp. °C. | Modulus of Elasticity (Pounds per square inch) | Flex (Cycles to break) | 25°C. | -10°C. | -20°C. | -30°C. | -40°C. | NO. |
| 50 | 50 | 0 | 69 | 73° | 167,000 | 3 | 1.7 | 1.1 | 1.1 | 1.1 | --- | 1 |
| | 30 | 20 | 43 | 71° | 130,000 | 65 | 12.0 | 11.3 | 9.8 | 10.3 | --- | 2 |
| | 20 | 30 | 27 | 79° | 132,000 | 100 | 10.8 | 11.1 | 10.7 | 10.5 | --- | 3 |
| | 10 | 40 | 13 | 80° | 122,000 | 6 | 5.2 | --- | 1.6 | --- | 1.0 | 4 |
| 55 | 35 | 10 | 63 | 83° | 177,000 | 81 | 13.1 | 9.7 | 9.6 | 9.1 | 7.7 | 5 |
| 60 | 30 | 10 | 74 | 84° | 198,000 | 18 | 9.2 | 10.7 | 9.3 | 7.4 | 6.4 | 6 |
| | 25 | 15 | 69 | 85° | 194,000 | 55 | 13.3 | 10.4 | 10.8 | 9.1 | 8.2 | 7 |
| | 20 | 20 | 63 | 84° | 177,000 | 58 | 11.5 | 11.5 | 11.2 | 10.6 | 8.7 | 8 |
| 65 | 25 | 10 | 81 | 85° | 216,000 | 5 | 5.4 | 6.7 | 4.5 | 2.8 | 1.0 | 9 |
| | 21 | 14 | 78 | 80° | 202,000 | 15 | 11.7 | 9.9 | 8.4 | 7.3 | 7.1 | 10 |
| | 20 | 15 | 77 | 86° | 199,000 | 22 | 12.5 | 10.9 | 10.1 | 8.3 | 6.5 | 11 |
| | 14 | 21 | 71 | 87° | 192,000 | 3 | 8.4 | --- | 6.9 | --- | 5.2 | 12 |
| | 7 | 28 | 62 | 85° | 202,000 | 6 | 5.2 | --- | 1.6 | --- | 1.0 | 13 |
| 70 | 20 | 10 | 84 | 89° | 216,000 | 4 | 2.2 | 2.3 | 1.6 | 1.0 | 0.8 | 14 |
| | 15 | 15 | 83 | 83° | 226,000 | 12 | 12.9 | 8.8 | 7.7 | 4.3 | 2.1 | 15 |
| | 10 | 20 | 81 | 90° | 188,000 | 13 | 10.5 | 7.8 | 5.9 | 3.2 | 1.9 | 16 |
| 75 | 15 | 10 | 92 | 88° | 294,000 | 1 | 2.3 | 1.4 | 0.9 | 0.3 | --- | 17 |
| | 10 | 15 | 90 | 84° | 332,000 | 2 | 2.4 | --- | 1.5 | --- | 0.7 | 18 |
| | 5 | 20 | 88 | 86° | 245,000 | 3 | 4.1 | --- | 1.3 | --- | 1.0 | 19 |
| 80 | 10 | 10 | 100 | 91° | 284,000 | 3 | 1.0 | --- | --- | --- | --- | 20 |
| | 5 | 15 | 99 | 89° | 284,000 | 7 | 4.4 | 1.3 | 0.8 | --- | --- | 21 |
| 85 | 5 | 10 | 102 | 88° | 355,000 | 5 | 1.7 | --- | --- | --- | --- | 22 |

Fig. 3.

INVENTOR.
ROBERT A. HAYES
BY
W. A. Fraser

TABLE II

| RESIN "A" | | | | GRAFTED COPOLYMER "B" | | | | | | | ELASTOMER "C" | PROPERTIES | | | | | | | | |
|---|---|---|---|---|---|---|---|---|---|---|---|---|---|---|---|---|---|---|---|---|
| Styrene-Type Compound | | Acrylonitrile Type Compound | | Grafted Monomers | | | | Total Monomers Grafted | Substrate | | | Hardness (Rockwell R) | Heat Distortion temp. (°C.) | Modulus (Pounds per square inch) | Flex (Cycles at break) | Impact Strength (ft.-lb. per inch of notch) At | | | | |
| | | | | Styrene-Type Compound | | Acrylonitrile Type Compound | | | | | | | | | | | | | | |
| Name | %[1] | Name | %[1] | Name | %[2] | Name | %[2] | %[3] | Character | Am't %[3] | | | | | | 25 °C. | -10 °C. | -20 °C. | -30 °C. | -40 °C. |
| Styrene | 78 | Acrylonitrile | 22 | Styrene | 78 | Acrylonitrile | 22 | 20 | Polybutadiene[4] | 80 | 90/10 Bd/S[5] | 86 | 86° | 280,000 | 4 | 3.3 | 2.9 | 2.3 | 1.3 | --- |
| | | | | | | | | 40 | Polybutadiene[4] | 60 | 90/10 Bd/S[5] | 78 | 80° | 202,000 | 15 | 11.7 | 9.9 | 8.4 | 7.3 | 7.1 |
| | | | | | | | | 60 | Polybutadiene[4] | 40 | 90/10 Bd/S[5] | 86 | 86° | 280,000 | 4 | 3.3 | 2.9 | 2.3 | 1.3 | --- |
| | | | | | 61 | Methacrylonitrile | 39 | 40 | Polybutadiene[4] | 60 | 90/10 Bd/S[5] | 75 | 86° | 210,000 | 2 | 2.0 | 1.2 | 1.1 | 0.9 | --- |
| | | | | α-Methyl styrene | 69 | Acrylonitrile | 31 | 40 | Polybutadiene[4] | 60 | 70/30 Bd/S[6] | 85 | 88° | 260,000 | 5 | 13.1 | 7.6 | 6.6 | 1.4 | 0.9 |
| | 61 | Methacrylonitrile | 39 | Styrene | 61 | Methacrylonitrile | 39 | 40 | Polybutadiene[4] | 60 | 90/10 Bd/S5 | 61 | 89° | 210,000 | 0 | 1.0 | --- | --- | --- | --- |
| | | | | α-Methyl styrene | 69 | Methacrylonitrile | 31 | 40 | Polybutadiene[4] | 60 | 90/10 Bd/S[5] | 67 | 90° | 210,000 | 1 | 4.5 | 3.8 | 2.7 | 2.0 | --- |
| α-Methyl Styrene | 69 | Acrylonitrile | 31 | Styrene | 78 | Acrylonitrile | 22 | 40 | Polybutadiene[4] | 60 | 90/10 Bd/S[5] | 66 | 98° | 188,000 | 4 | 5.2 | 4.0 | 3.2 | 2.3 | 1.9 |
| | | | | | | | | | 75/25 Bd/S[7] | 60 | Poly-Bd[4] | 60 | 97° | 181,000 | 1 | 2.3 | 1.8 | 1.2 | 1.0 | 0.9 |
| | | | | α-Methyl styrene | 69 | Acrylonitrile | 31 | 40 | Polybutadiene[4] | 60 | 90/10 Bd/S[5] | 85 | 108° | 228,000 | 2 | 5.7 | 4.5 | 3.9 | 2.2 | 1.4 |
| | | | | | | | | | | | 90/10 Bd/A[8] | 82 | 108° | 251,000 | 3 | 6.4 | 5.2 | 4.9 | 2.7 | 2.2 |
| | 64 | Methacrylonitrile | 36 | Styrene | 78 | Acrylonitrile | 22 | 40 | 75/25 Bd/S[7] | 60 | 90/10 Bd/S[5] | 81 | 110° | 242,000 | 0 | 1.2 | 1.0 | 0.9 | --- | --- |

Fig. 4.

INVENTOR.
ROBERT A. HAYES
BY W. A. Fraser 2,802,808
Patented Aug. 13, 1957

2,802,808

COMPOSITIONS OF A STYRENE-ACRYLONITRILE RESIN, A GRAFT OF STYRENE AND ACRYLONITRILE UPON A DIENE RUBBER AND A DIENE RUBBER

Robert A. Hayes, Akron, Ohio, assignor to The Firestone Tire & Rubber Company, Akron, Ohio, a corporation of Ohio Application July 31, 1953, Serial No. 371,573
14 Claims. (Cl. 260—45.5)

This invention relates to novel polycomponent blends of high polymeric materials, and more particularly to compositions comprising (A) a styrene-acrylonitrile-type copolymer resin, (B) a graft copolymer of a mixture of styrene and acrylonitrile or their equivalents upon a butadiene-type hydrocarbon rubber, and (C) a butadiene-type hydrocarbon rubber. As used in this specification, and as defined in the Report on Nomenclature of the International Union of Pure and Applied Chemistry, Journal of High Polymer Science, vol. VIII, p. 260, the term "graft copolymer of a mixture of styrene and acrylonitrile upon a butadiene-type hydrocarbon rubber" signifies a polymeric product produced by subjecting a mixture of styrene and acrylonitrile or their equivalents to polymerizing conditions in the presence of a previously polymerized butadiene-type hydrocarbon rubber, as more fully described herein below.

A number of proposals have been made to combine resinous polymers with rubbery polymers to yield materials which have novel properties not found in either of the individual components. For instance, compositions comprising vinyl chloride resins with rubbery butadiene-acrylonitrile copolymers, and compositions comprising styrene-acrylonitrile copolymers with rubbery butadiene-acrylonitrile copolymers have enjoyed some commercial success, these compositions being rather broadly, stiff materials which, in sheet form, may be hot post-formed into a variety of articles. Unfortunately, these products do not have the combination of properties of (*a*) high modulus coupled with good heat distortion characteristics, together with (*b*) high impact strength over any wide range of temperatures.

Accordingly, it is an object of this invention to provide novel poly-component polymeric compositions.

Another object is to provide such compositions based upon relatively inexpensive starting materials, and specifically upon butadiene, styrene, and acrylonitrile, and homologs of these compounds.

A further object is to provide such compositions which will make at least partial use of commercially available polymeric materials such as rubbery butadiene-type rubbers and resinous styrene-acrylonitrile copolymers.

Still another object is to provide such compositions which will have improved and novel properties adapting them for novel uses, and which particularly will have high impact strength, high heat distortion point and a high modulus of elasticity.

Still another object is to produce such compositions having excellent low temperature impact strength without any substantial impairment of the other excellent properties noted in connection with the preceding objects.

A still further object is to provide novel compositions which, in sheet form, are adapted for hot post-forming into various structures.

A still further object is to provide novel molding compositions suitable for injection-molding and extrusion.

Still other objects will become apparent as the description proceeds.

The invention will be described in connection with the accompanying drawings, wherein:

Fig. 1 is a fragmentary trilinear chart of preferred compositions of this invention, on which chart are plotted the contour lines for impact strength of the compositions;

Fig. 2 is a small scale chart of which Fig. 1 is a part, showing the boundaries of the compositions of this invention;

Fig. 3 is a table showing the variation of the properties of the compositions of this invention with changing ratios of the individual constituents thereof; and Fig. 4 is a table showing variations of the properties of the compositions of this invention with alterations in the character of the individual constituents thereof.

SYNOPSIS OF THE INVENTION

Figures 1, 2:
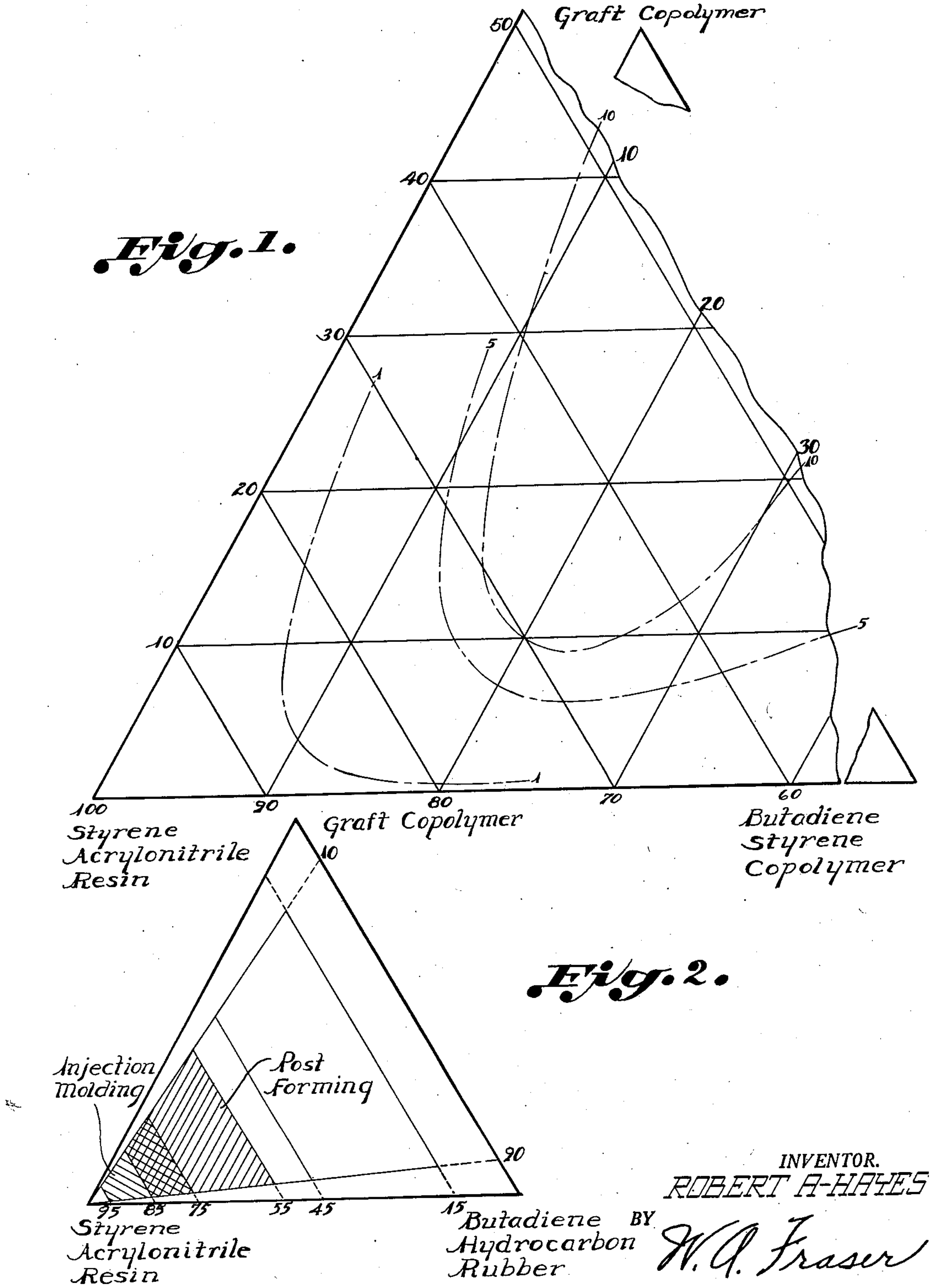

The above and other objects are secured, in accordance with this invention, in compositions having the following components in the following proportions:

| | Percent |
|---|---|
| A. A styrene-acrylonitrile type resin | [1] 15–95 |
| B. A graft copolymer of a styrene-acrylonitrile type mixture of monomers upon a butadiene-type hydrocarbon rubber | [2] 10–90 |
| C. A butadiene-type hydrocarbon rubber | [2] 10–90 |

[1] Based on the total weight of constituents A, B and C.
[2] Based on the combined weight of the constituents B and C, exclusive of ingredient A.

Ingredients A, B and C in turn should constitute at least 75% of the entire composition, the balance being made up of conventional fillers, pigments, reinforcing agents, plasticizers, stabilizers and the like. The resultant compositions form compatible mixtures, notwithstanding the known incompatibility of styrene-acrylonitrile type resins with butadiene-type rubbers. The compositions have excellent impact strengths, heat distortion temperatures, moduli of elasticity and tensile strengths. Particularly those compositions containing 55 to 85% of styrene-acrylonitrile type resins are useful in the form of relatively stiff, heavy sheets designed for post-forming into a wide variety of shaped structures. They also may be fabricated into various shapes by injection molding and extrusion. The post-forming sheets of the compositions of this invention have unusually excellent low temperature properties, especially when the butadiene-type hydrocarbon rubber copolymer C contains not more than 20% styrene or styrene homologs.

The compositions of this invention containing relatively higher proportions of a styrene-acrylonitrile type resin, say 75% to 95% based on the weight of the essential ingredients A, B and C, find particular application in injection molding. Compositions of this type combine the excellent strength and hardness of styrene-acrylonitrile type resins with a high degree of resistance to impact loads.

*The graft copolymers of styrene-acrylonitrile type mixtures upon rubbery butadiene polymers and copolymers*

These are materials produced by adding monomeric mixtures of styrene and acrylonitrile or their homologs to an already completely or nearly completely free-radical-polymerized latex of a butadiene-type hydrocarbon rubber which latter material will be more elaborately discussed hereinbelow. Polymerization by free-radical mechanisms is then continued. In the resultant product, the styrene and acrylonitrile or their homologs appear to have combined with the already polymerized butadiene; at any rate, only small amounts of the polymers or copolymers of the styrene and acrylonitrile can be separated therefrom by physical methods. Such products are referred to in this specification as "graft copolymers" of mixtures of styrene and acrylonitrile or their homologs upon the butadiene-type hydrocarbon rubber. Without absolute commitment to this theory, it is believed that centers along the chains of already polymerized butadiene in the original latex are reactivated and serve to start new branching side-chains of polymerized styrene and acrylonitrile (or their homologs) attached to the old butadiene polymer chains.

With reference to the mixture of monomers to be graft copolymerized upon the butadiene rubber, these are stated above to include mixtures of styrene and acrylonitrile. However, in these mixtures the styrene is successfully replaced by alpha-methyl styrene; and the acrylonitrile is successfully replaced by alpha-methyl acrylonitrile designated hereinafter for convenience as "methacrylonitrile." It will be understood that the replacements are independent of each other, and that any combination of (*a*) styrene or alpha-methyl styrene with (*b*) acrylonitrile or methacrylonitrile is operative. The styrene or alpha-methyl styrene should constitute 50–90%, and the acrylonitrile or methacrylonitrile should constitute 10–50%, of the weight of the mixture of monomers to be grafted.

With reference to the butadiene-type hydrocarbon rubber latex upon which the styrene and acrylonitrile or their homologs are to be graft copolymerized, this is a latex of (I) essentially a homopolymer of butadiene, or (II) essentially a copolymer of butadiene with (1) styrene, with (2) alpha-methyl styrene or with (3) a mixture of styrene and alpha-methyl styrene. The copolymers (II) should contain at least 60% of butadiene copolymerized therein. The operative homopolymers and copolymers include those containing, in addition to the butadiene and any styrene and/or alpha-methyl styrene, not over 10% of other non-cross-linking ethylenically unsaturated compounds copolymerizable therewith, which copolymerizable compounds may be either mono-unsaturated or conjugated di-unsaturated. It is considered that the essential hydrocarbon nature of the butadiene and styrene and/or alpha-methyl styrene polymerized into the rubber will not be disturbed by the inclusion of not over 10% of other comonomers, even though these latter in some cases are not purely hydrocarbon in character. Very small proportions, say up to 3%, of non-conjugated cross-linking di-unsaturated compounds such as divinyl benzene, may also be present in the copolymers. It will be understood that the above percentages are on the basis of the weight of the copolymers. Suitable monomers for copolymerization with butadiene include, for instance, vinyl compounds such as vinyl acetate, vinyl formate, vinyl propionate, higher fatty vinyl esters such as vinyl stearate, vinyl chloride, vinyl fluoride and the like; vinyl aromatics such as the various mono- and poly-nuclearly chlorinated styrenes, vinyl naphthalene, vinyl carbazole and the like; vinyl ethers nad ketones such as methyl vinyl ether, isopropyl vinyl ether and the like; vinylidene compounds such as vinylidene chloride, vinylidene chlorobromide, methyl isopropenyl ketone, isopropenyl acetate and the like; acrylic compounds such as acrylic acid, methacrylic acid, methyl acrylate, methyl methacrylate, ethyl acrylate, diethyl maleate, maleic anhydride, and the like; and conjugated unsaturated compounds such as isoprene, 2,3-dimethyl-1,3-butadiene, chloroprene, piperylene, 2,3-dichloro-1,3-butadiene and the like. For a more complete list of compounds known to copolymerize with butadiene, reference is made to Krczil "Kurzes Handbuch der Polymerisations—Technik," Edwards Brothers, Inc. vol. 2, p. 655, 656, the items indented under "Butadien."

The original polymerization of the latex upon which the styrene-acrylonitrile type mixture is to be graft copolymerized is carried out in accordance with any usual or suitable procedure in this art. In general, the butadiene, together with any comonomers to be used, is emulsified in water with the aid of micelle-forming emulsifying agents which are usually compounds containing hydrocarbon groups of from 8 to 22 carbon atoms coupled to highly polar solubilizing groups such as alkali metal and ammonium carboxylate groups, sulfate half-ester groups, sulfonate groups, phosphate partial ester groups and the like. Exemplary emulsifying agents include sodium oleate, sodium stearate, the sodium salts of the sulfate half esters of fatty alcohols produced by reduction of the fatty acids of natural oils such as cocoanut oil, sodium abietate, sodium salts of sulfosuccinic esters such as sodium dioctyl sulfosuccinate, sodium salts of alkylated benzene and naphthalene sulfonic acids such as sodium didodecyl naphthalene sulfonate, sodium salts of monosulfated fatty monoglycerides and the like. The polymerization medium will contain a suitable water-soluble free-radical-generating catalyst such as hydrogen peroxide, potassium or sodium persulfates, perborates, peracetates, percarbonates and the like, which catalysts may be associated with activating systems such as Redox systems involving versivalent metals and mild reducing agents. Generally also the polymerization medium contains a chain-transfer agent such as a higher alkyl mercaptan on the order of dodecyl mercaptan which both moderates the molecular weights of the products and also assists in initiating the action of the catalysts in the polymerization. However, these are preferably used in somewhat smaller quantities than is ordinarily the case when butadiene is being polymerized to produce a general purpose elastomer, as any residual chain transfer agent may unduly retard the reaction of the styrene or alpha-methyl styrene added for graft copolymerization. Polymerization is carried out at temperatures from about 40° C. to 80° C. or, in the case of the activated systems, is carried out over a range including lower temperatures such as 0° C. to 80° C. The polymerization will usually be carried to a conversion of at least about 75% before the monomers are added for graft copolymerization thereon. Any unreacted butadiene and associated comonomer is optionally, and preferably, stripped off from the latex before the monomers are added for graft copolymerization.

To the latex prepared as just described, there is added a mixture of styrene or alpha-methyl styrene and acrylonitrile or methacrylonitrile in amounts such that the total added monomers constitute at least 10% of the combined weight of this newly added monomeric mixture and the butadiene polymer or copolymer already in the latex. Polymerization is continued, either under the action of the catalyst originally supplied in the preparation of the butadiene polymer or copolymer latex, or by the action of supplemental catalysts of the same type. Polymerization conditions are continued until the amount of the mixture of styrene or alpha-methyl styrene and acrylonitrile or methacrylonitrile which has graft copolymerized upon the butadiene polymer or copolymer latex amounts to from 10% to 80% of the entire resultant graft copolymer. The resultant latex is either coagulated at once to recover the graft copolymer for mill-mixing with the other constituents, or the latex is used for blending with the other ingredients in latex form.

*The butadiene-type rubber*

The preparation of polymers of this type follow closely the procedure described hereinabove under "The Graft Copolymers" down to the point just short of the addition of monomer for graft copolymerization. The range of monomers used and the proportions thereof will be the same as for the graft copolymer substrates, i. e., the products must contain at least 60% butadiene, any balance being constituted of styrene and/or alpha-methyl styrene, with not more than 10% of any other unsaturated compounds. From the standpoint of low temperature properties in the final compositions of this invention, the straight homopolymers of butadiene, or copolymers containing 90–100% of butadiene and 0–10% of styrene will be found preferable. There will be no special restriction on the amount of chain transfer agents employed, since there will be no graft polymerization reaction. In other respects, the preparation will be the same. There is no particular upper limit on the viscosity of the butadiene polymer or copolymer. Polymers having Mooney viscosities in excess of 180 ML-4 have been used successfully. Soft polymers, as low as 15 ML-4 have also been used. The latex produced in the polymerization reaction may either be coagulated and dried to recover the materials for mill mixing with the other ingredients, or the latex may be used for blending with the other ingredients in latex form.

*The styrene-acrylonitrile type resins*

These are simple copolymers of:

| | Percent |
|---|---|
| Styrene or alpha-methyl styrene or mixtures thereof | 50–90 |
| Acrylonitrile or methacrylonitrile or mixtures thereof | 10–50 |
| Other ethylenically unsaturated compounds, the percentages being based on the weight of the copolymers | 0–10 |

As noted in the recipe, in addition to the styrene and/or alpha-methyl styrene and acrylonitrile and/or methacrylonitrile which form the essential structure of the resins employed in this invention, the resins in some cases also contain small amounts, e. g., not over 10%, of other ethylenically unsaturated compounds copolymerizable with the styrene, alpha-methyl styrene, acrylonitrile and methacrylonitrile. Such unsaturated compounds include mono-unsaturated compounds and conjugated diunsaturated compounds such as vinyl esters on the order of vinyl chloride, vinyl fluoride, vinyl acetate; acrylic compounds such as acrylic and methacrylic acids, esters, amides, and nitriles on the order of methyl methacrylate, ethyl acrylate, fumaronitrile and acrylonitrile; vinylidene compounds such as vinylidene chloride and trifluorochloroethylene; cyclic unsaturated compounds such as the nuclear chlorostyrenes, vinyl naphthalene, vinyl carbazole, acenaphthylene; and conjugated unsaturates such as butadiene, isoprene, chloroprene, 2,3-dichlorobutadiene, piperylene and the like. These latter named dienes will have a tendency to reduce the heat distortion points of the final compositions.

The copolymerization of the resins employed in this invention is carried out in emulsion by the techniques described above under "The Graft Copolymers," the styrene, alpha-methyl styrene, acrylonitrile, methacrylonitrile and any other comonomers replacing the butadiene, and the process being carried out to a point short of that at which the to-be-graft-copolymerized monomers are added. In such cases there will usually result a latex of a resinous copolymer of styrene or alpha-methyl styrene with acrylonitrile or methacrylonitrile which may either be coagulated to yield the solid powdery copolymer resin, or may be used as such for blending with one or both of the other constituents in the form of latices. The most important variable in the resinous constituent is its molecular weight (as reflected by its viscosity which is an increasing function of molecular weight). From the standpoints of ready processing and toughness of calendered sheet, lower viscosity resins, having relative viscosities in the range of 1.4–3.0 are preferable. In this specification, the "relative viscosity" given for any resin designates the relative viscosity of the resin in 1% acetone solution. There are indications that in some cases mixtures of high and low molecular weight resins may be advantageous.

*The compounding of the compositions*

The proportions in which the three essential components of the compositions of this invention should be supplied have been set out in detail above. The compositions within the broad range of the compositions of this invention, but more particularly containing a minimum of 45% of the styrene-acrylonitrile type copolymer resin, constitute a preferred class.

Referring to the mode of compounding the materials of this invention, one convenient method is to thoroughly mix together latices containing the several components, and thereafter to add a coagulating agent to cause all the materials to be simultaneously coprecipitated from the mixed latex. This method has the advantage of ready and accurate measurement, a somewhat more thorough and reliable blending, and a saving in power expenditure over mill mixing. The alternative is, of course, to blend solid components by means of a roll mill, Banbury mill or the like. No great difference in properties between compositions prepared by the two methods has been noted.

Compositions according to this invention may be used in a variety of applications, and those containing from 55 to 85% of the styrene-acrylonitrile type resin, based on the total weight of the three essential components, are of particular advantage in relatively heavy semi-rigid sheetings approximately .05 to .3 inch thick adapted for use directly as flat panelings etc. or for post-forming into simple or compound curved panelings for automotive and other vehicle interiors, automotive wheel housings, formed luggage shells and the like; sink and drainboard shells and other plumbing equipment, counters and enclosures; interior architectural trim; appliance standards, racks and the like; large display letters, signs and the like; sales racks; tote-boxes for use in manufacturing and order-assembling establishments; and cabinets for radio and television receivers. The compositions are readily calendered out at moderate temperatures into sheetings of the type above described, and withstand the necessary hot working without noticeable change in properties or appearance; the sheetings may be post-formed at relatively low temperatures, and accept relatively deep draws without undue localized attenuation. In the finished fabricated articles the materials have excellent dimensional stability and sufficiently high heat distortion points, usually 85–90° C. or better, so as to hold any shapes into which they may be fabricated. Their excellent impact strengths ensure their freedom from cracking or shattering under any stresses and shocks likely to be encountered in service. This excellent impact strength is retained even at low temperatures, which is important in the case of vehicle panelings, which may be exposed to winter temperatures.

The compositions of this invention may also be employed for compression and injection molding of various objects, and in this application combine the excellent strength, hardness and dimensional stability of the basic styrene-acrylonitrile type resin with a greatly improved impact strength and resistance to flex fatigue. Compositions for this purpose should preferably contain from 75 to 95% of the styrene-acrylonitrile type resin based on the weight of the three essential components. The compositions may be extruded to form beadings, sealer strips, tubing and the like and, particularly the blends containing resins of low molecular weight, may be extruded as thin tubes or sheets which may be blown or otherwise stretched to form thin, flexible wrapping etc. films. Further, the compositions may be applied in the form of mixed latices without being first coprecipitated to the solid form; for instance the mixed latices may be used for coating and impregnating, and for the casting of self-supporting flexible wrapping films.

With the foregoing general discussion in mind, there are given herewith detailed examples of the practice of this invention. All parts given are by weight.

EXAMPLE I.—POLYMER PROPORTION STUDY

A. *Preparation of substrate for the graft copolymer*

| | Parts |
|---|---|
| Butadiene (containing about 2% divinyl benzene as impurity) | 100 |
| Water (demineralized) | 330 |
| Soap flakes (sodium oleate and stearate) | 7.5 |
| Potassium persulfate | 0.7 |
| Dodecyl mercaptan | 0.05 |

It will be noted that the above formula contains less than the conventional amount of modifier (dodecyl mercaptan).

The polymerization was carried out in a closable reactor provided with a heating and cooling jacket and with an anchor stirrer. The water, soap flakes, potassium persulfate and dodecyl mercaptan were charged in that order, with stirring to dissolve. The reactor was then closed, the reactor space above the liquid purged with butadiene vapor, and the formula amount of butadiene charged. The temperature was then raised to 140° F. and agitation commenced, this temperature and agitation being maintained for 24 hours, at which time the pressure had dropped to 30 pounds per square inch gauge. The butadiene was then vented with continued stirring of the contents of the reaction vessel. The latex remaining in the vessel contained about 30% of polybutadiene dispersed therein.

B. *Preparation of the graft copolymer*

| | Parts |
|---|---|
| Polybutadiene latex (containing 30% of polybutadiene dispersed in an aqueous medium; prepared as just described) | 200 |
| Styrene | 31.2 |
| Acrylonitrile | 8.8 |
| Potassium persulfate | 0.2 |
| Water (distilled) | 80 |

The latex, water, styrene, acrylonitrile and potassium persulfate were charged at 25° C. into a closable vessel in the order named, the residual air in the vessel purged with nitrogen, and the vessel sealed. The charge was then raised to 70° C. and agitated at this temperature for 18 hours. The resultant latex was stabilized by the addition of a stopping agent, and then filtered. The filtered latex was used in preparing compositions according to this invention.

C. *Preparation of compositions*

| | |
|---|---|
| Graft copolymer latex (prepared as just described) | Sufficient to provide proportions of materials as indicated in Table I. |
| Latex of a styrene-acrylonitrile resin (resin containing 78% styrene, balance acrylonitrile; relative viscosity of resin in 1% acetone solution at 25° C., 1.7; the latex contained 25% of resin by weight) | |
| Latex of butadiene-styrene copolymer (latex containing a rubbery copolymer of 90% butadiene, balance styrene by weight; "Arctic" type rubber prepared in an activated Redox system at 5° F.; the copolymer constitutes 30% by weight of the latex) | |

A series of compositions was made up, containing the above graft copolymer, styrene-acrylonitrile resin and butadiene-styrene copolymer in various proportions as set forth in Table I, Fig. 3 of the drawings. In each case, amounts of the above listed latices, calculated to contain the polymers in the quantities selected for the particular composition, were thoroughly mixed together, and coagulated by addition of a 1% aqueous solution of calcium chloride. The coagulum was then dewatered on a filter, washed with water on the filter, dried, milled on a roll mill at 310–320° F. for 20 minutes, sheeted off as a sheet about 3/16 inch thick, and the sheet cooled. The sheet was then press-polished at 350° F. in a flat-platen press, the cycle being 9 minutes preheat without pressure, 1 minute under pressure of 100 pounds per square inch, 5 minutes cooling to room temperature under 100 pounds per square inch, and removal from the press.

From samples of the sheets, the mechanical properties of the compositions were determined and are set forth in Table I, in Fig. 3 of the drawings. Likewise plotted on Fig. 1 are the contour lines for the impact strength of these compositions, the numbers adjacent contour lines being the values of the impact strength.

EXAMPLE II.—VARIATION OF THE CONSTITUTION OF THE INDIVIDUAL POLYMERIC CONSTITUENTS

| | Parts by weight of solids in latex |
|---|---|
| Resinous copolymer latex (copolymer of (A) styrene or alpha-methyl styrene with (B) acrylonitrile or methacrylonitrile as indicated in Table II) | 65 |
| Graft copolymer latex (prepared in general as in Example I but using various mixtures of (A) styrene or alpha-methyl styrene and with (B) acrylonitrile or methacrylonitrile and graft copolymerizing upon various diene rubber latices as indicated in Table II and described in detail in the notes to Table II) | 20 |
| Butadiene rubber-type latex (various butadiene polymers and copolymers as indicated in Table II and in the notes thereto) | 15 |

A series of compositions made up using various combinations of latices containing various graft copolymers, styrene-acrylonitrile resins and butadiene-type rubber elastomers in the proportions indicated in the foregoing schedule and using individual constituents as indicated in Table II, Fig. 4 of the drawings. In each case the latices in quantities sufficient to yield the amounts of the respective polymeric substances indicated above were blended, coagulated and worked up into press-polished sheets as in Example I. Tabulated in Table II are the properties of the several compositions. The resin and graft copolymers used were prepared in recipes and by procedures exactly like those described hereinabove in Example I except that the 40 parts of styrene in the recipe B "Preparation of Graft Copolymer" were replaced by 40 parts of a mixture of styrene or alpha-methyl styrene with acrylonitrile or methacrylonitrile in the percentages indicated in the table. Likewise, in certain of the graft copolymers, the butadiene latex used as a substrate of the graft copolymer prepared in Example I was replaced by a latex of a copolymer of 75 parts of butadiene and 25 parts of styrene prepared in a conventional recipe polymerized at 140° F.—i. e., the conventional GR–S rubber latex. Particulars as to certain elements in Table II are given in the following notes to Table II, the numbers corresponding to superscripts in the table.

NOTES TO TABLE II

1. These percentages indicate the proportions of styrene or alpha-methyl styrene and acrylonitrile or methacrylonitrile on the basis of the dry weight of the resin in the latex used. The resin itself constituted 30% of the weight of the latex in all cases.

2. These percentages are on the basis of the total weight of styrene or methyl styrene and acrylonitrile or methacrylonitrile in the mixture of these monomers used in the graft copolymerization recipe of Example I. The total weight of these mixed monomers was varied in different graft copolymers prepared as indicated in note 3.

3. These percentages are on the basis of the total weight of (*a*) the mixture of styrene or alpha-methyl styrene and acrylonitrile or methacrylonitrile used in the grafted monomers plus (*b*) the weight of the butadiene type rubber in the latex used as a substrate of the graft copolymer. All of these graft copolymers were prepared in accordance with the recipe and polymerization schedule set forth in Example I under B–2 "Preparation of Graft Copolymers." All quantities were kept exactly the same as in that recipe except that when monomers other than styrene and acrylonitrile were used they were employed in the proportions relatively to each other as indicated in the columns denoted (2).

4. This polymer was prepared as described in Example I under A–1 "Preparation of Elastomer Substrate."

5. An "arctic type" butadiene-styrene copolymer containing 90% butadiene, balance styrene prepared in an activated Redox system as 5° F. Mooney viscosity 140.

6. A conventional buna–S, GR–S latex containing 70% butadiene, balance styrene prepared in emulsion system at 140° F.

7. A conventional butadiene/styrene copolymer containing 75% butadiene, balance styrene prepared in emulsion system at 140° F.

EXAMPLE III.—INJECTION MOLDING COMPOSITIONS

| | |
|---|---|
| Graft copolymer of 40 parts of (A) a mixture of 78% styrene, balance acrylonitrile upon 60 parts of polybutadiene (prepared as described in Example I) | Sufficient to provide percentages of the dry constituents, based on the total weight of dry constituents, as indicated in Tables III & IV. |
| Latex of a resinous copolymer of 78% styrene, balance acrylonitrile (the same material as in Example I) | |
| Butadiene/styrene copolymer latex (the same material as in Example I) or Polybutadiene latex | |

As series of compositions was made from the materials set forth in the above schedule, in proportions indicated in Tables III and IV. In each case the latices were thoroughly mixed together and coagulated by addition of a 1% solution of calcium chloride, the coagulum dewatered on a filter, washed with water on the filter, dried, milled on a roll mill at 310–320° F. for twenty minutes and sheeted off at a thickness of 3/16 inch. The sheet was then comminuted in a cutting machine, yielding cubes of about 1/16 inch on each side, and the resultant cubes used as a molding powder in an injection molding machine to provide test specimen plaques. Conditions of molding were 170° C. and pressure of 20,000 pounds per square inch. The properties of the compositions were determined and are set forth in Tables III and IV below. Impact strengths are given in foot-pounds per inch of notch.

From the foregoing general discussion and detailed specific examples it will be seen that this invention provides novel polymeric compositions suitable for the preparation of post-forming sheet materials and for general molding purposes. The compositions are characterized by concurrent high impact strength at both high and low temperatures coupled with general good properties in other respects, notably high heat distortion points, hardness and high modulus. The essential starting materials for the compositions (butadiene, styrene and acrylonitrile and their homologs) are cheaply and abundantly avialable.

What is claimed is:

1. A strong, impact resistant, polycomponent polymeric composition comprising:

(A) A styrene-acrylonitrile-type resin ---------- 15–95%, based on the total weight of constituents (A), (B) and (C).

(B) A graft copolymer of a styrene-acrylonitrile-type mixture of monomers upon a butadiene rubber ---------- 10–90%, based upon the weight of constituents (B) and (C).

(C) A butadiene rubber ---------- 10–90%, based upon the weight of constituents (B) and (C).

said styrene-acrylonitrile type resin (A) being a copolymer of 50–90% of a styrene-type compound selected from the group consisting of styrene and alpha-methyl styrene with 10–50% of an acrylonitrile-type compound selected from the group consisting of acrylonitrile and methacrylonitrile, these last two percentages being on the basis of the weight of the resin, said graft copolymer (B) being a graft, produced by subjecting to polymerizing conditions, in the presence of an already polymerized butadiene rubber substrate, a mixture of monomers containing 50–90% of a compound selected from the group consisting of styrene and alpha-methyl styrene and 10–50% of a compound selected from the group con-

TABLE III.—INJECTION MOLDING COMPOSITIONS CONTAINING BUTADIENE-STYRENE RUBBER

| Proportions of Constituents (Percent) | | | Properties of the Compositions | | | | | | Item No. |
|---|---|---|---|---|---|---|---|---|---|
| Resinous Copolymer | Graft Copolymer | Butadiene Styrene Copolymer | Hardness (Rockwell R) | Modulus of Elasticity (Pounds per sq. inch) | Heat Distortion Temp. (° C.) | Impact Strength At— 25° C. | −10° C. | −30° C. | |
| 80 | 10 | 10 | 87 | 304,000 | 86 | 6.0 | -------- | 1.0 | 1 |
| 85 | 15 | 0 | 107 | 324,000 | 85 | 0.6 | -------- | -------- | 2 |
| | 9 | 6 | 105 | 344,000 | 88 | 1.3 | 0.5 | -------- | 3 |
| 90 | 2 | 8 | 107 | 358,000 | 87 | 1.3 | -------- | -------- | 4 |

TABLE IV.—INJECTION MOLDING COMPOSITIONS CONTAINING POLYBUTADIENE

| Proportions of Constituents (Percent) | | | Properties of the Compositions | | | | Item No. |
|---|---|---|---|---|---|---|---|
| Resinous Copolymer | Graft Copolymer | Polybutadiene | Hardness (Rockwell R) | Modulus of Elasticity (Pounds per sq. inch) | Impact Strength At— 25° C. | −30° C. | |
| | 10 | 15 | 88 | 242,000 | 6.0 | 1.6 | 1 |
| 75 | 15 | 10 | 91 | 267,000 | 6.1 | 1.6 | 2 |
| | 5 | 15 | 94 | 297,000 | 1.5 | 0.7 | 3 |
| 80 | 10 | 10 | 97 | 301,000 | 6.7 | 0.9 | 4 |
| 85 | 5 | 10 | 100 | ------------ | 2.2 | ---------- | 5 |

sisting of acrylonitrile and methacrylonitrile, these last two percentages being on the basis of the weight of the monomer mixture, and the substrate of the graft being a butadiene rubber as specified hereinbelow for the constituent (C), the weight of said monomers grafted into said graft copolymer constituting from 10 to 80% of the weight of the graft copolymer, and said butadiene rubber (C) being selected from the group consisting of homopolymers of butadiene and copolymers thereof containing at least 60% butadiene and up to 40% styrene, up to 40% of alpha-methyl styrene and up to 10% of other ethylenically unsaturated compounds copolymerizable therewith.

2. A strong, impact resistant, polycomponent, polymeric composition comprising:

| | |
|---|---|
| (A) A styrene-acrylonitrile-type resin | 45–95%, based on the total weight of constituents (A), (B) and (C). |
| (B) A graft copolymer of a styrene-acrylonitrile-type mixture of monomers upon a butadiene rubber | 10–90%, based upon the weight of constituents (B) and (C). |
| (C) A butadiene rubber | 10–90%, based upon the weight of constituents (B) and (C). |

said styrene-acrylonitrile type resin (A) being a copolymer of 50–90% of a styrene-type compound selected from the group consisting of styrene and alpha-methyl styrene with 10–50% of a compound selected from the group consisting of acrylonitrile and methacrylonitrile, these last two percentages being on the basis of the weight of the resin, said graft copolymer (B) being a graft, produced by subjecting to polymerizing conditions, in the presence of an already polymerized butadiene rubber substrate, a mixture of monomers containing 50–90% of a compound selected from the group consisting of styrene and alpha-methyl styrene and 10–50% of a compound selected from the group consisting of acrylonitrile and methacrylonitrile, these last two percentages being on the basis of the weight of the monomer mixture, and the substrate of the graft being a butadiene rubber as specified hereinbelow for the constituent (C), the weight of said monomers grafted into said graft copolymer constituting from 10 to 80% of the weight of the graft copolymer, and said butadiene rubber (C) being selected from the group consisting of homopolymers of butadiene and copolymers thereof containing at least 60% butadiene and up to 40% styrene, up to 40% of alpha-methyl styrene and up to 10% of other ethylenically unsaturated compounds copolymerizable therewith.

3. A strong, impact resistant, polycomponent, polymeric composition comprising:

| | |
|---|---|
| (A) A styrene-acrylonitrile-type resin | 55–85%, based on the total weight of constituents (A), (B) and (C). |
| (B) A graft copolymer of a styrene-acrylonitrile-type mixture of monomers upon a butadiene rubber | 10–90%, based upon the weight of constituents (B) and (C). |
| (C) A butadiene rubber | 10–90%, based upon the weight of constituents (B) and (C). |

said styrene-acrylonitrile type resin (A) being a copolymer of 50–90% of a styrene-type compound selected from the group consisting of styrene and alpha-methyl styrene with 10–50% of a compound selected from the group consisting of acrylonitrile and methacrylonitrile, these last two percentages being on the basis of the weight of the resin, said graft copolymer (B) being a graft, produced by subjecting to polymerizing conditions, in the presence of an already polymerized butadiene rubber substrate, a mixture of monomers containing 50–90% of a compound selected from the group consisting of styrene and alpha-methyl styrene and 10–50% of a compound selected from the group consisting of acrylonitrile and methacrylonitrile, these last two percentages being on the basis of the weight of the monomers mixture, and the substrate of the graft being a butadiene rubber as specified hereinbelow for the constituent (C), the weight of said monomers grafted into said graft copolymer constituting from 10 to 80% of the weight of the graft copolymer, and said butadiene rubber (C) being selected from the group consisting of homopolymers of butadiene and copolymers thereof containing at least 60% butadiene and up to 40% styrene, up to 40% of alpha-methyl styrene and up to 10% of other ethylenically unsaturated compounds copolymerizable therewith.

4. A strong, impact resistant, polycomponent, polymeric composition comprising:

| | |
|---|---|
| (A) A styrene-acrylonitrile-type resin | 75–95%, based on the total weight of constituents (A), (B) and (C). |
| (B) A graft copolymer of a styrene-acrylonitrile-type mixture of monomers upon a butadiene rubber | 10–90%, based upon the weight of constituents (B) and (C). |
| (C) A butadiene rubber | 10–90%, based upon the weight of constituents (B) and (C). |

said styrene-acrylonitrile type resin (A) being a copolymer of 50–90% of a styrene-type compound selected from the group consisting of styrene and alpha-methyl styrene with 10–50% of a compound selected from the group consisting of acrylonitrile and methacrylonitrile, these last two percentages being on the basis of the weight of the resin, said graft copolymer (B) being a graft produced by subjecting to polymerizing conditions, in the presence of an already polymerized butadiene rubber substrate, a mixture of monomers containing 50–90% of a compound selected from the group consisting of styrene and alpha-methyl styrene and 10–50% of a compound selected from the group consisting of acrylonitrile and methacrylonitrile, these last two percentages being on the basis of the weight of the monomer mixture, and the substrate of the graft being a butadiene rubber as specified hereinbelow for the constituent (C), the weight of said monomers grafted into said graft copolymer constituting from 10 to 80% of the weight of the graft copolymer, and said butadiene rubber (C) being selected from the group consisting of homopolymers of butadiene and copolymers thereof containing at least 60% butadiene and up to 40% styrene, up to 40% of alpha-methyl styrene and up to 10% of other ethylenically unsaturated compounds copolymerizable therewith.

5. A strong, impact resistant, polycomponent, polymeric composition comprising:

| | |
|---|---|
| (A) A copolymer of 50–90% styrene, balance acrylonitrile | 15–95%, based upon the total weight of constituents (A), (B) and (C). |
| (B) A graft copolymer of a styrene-acrylonitrile-type mixture of monomers upon a butadiene rubber | 10–90%, based upon the weight of constituents (B) and (C). |
| (C) A butadiene rubber | 10–90%, based upon the weight of constituents (B) and (C). |

said graft copolymer (B) being a graft produced by subjecting to polymerizing conditions, in the presence of an already polymerized butadiene rubber substrate, a mixture of monomers containing 50–90% of a compound selected from the group consisting of styrene and alphamethyl styrene and 10–50% of a compound selected from the group consisting of acrylonitrile and methacrylonitrile, these last two percentages being on the basis of the weight of the monomer mixture, and the substrate of the graft being a butadiene rubber as specified hereinbelow for the constituent (C), the weight of said monomers grafted into said graft copolymer constituting from 10 to 80% of the weight of the graft copolymer, and said butadiene rubber (C) being selected from the group consisting of homopolymers of butadiene and copolymers thereof containing at least 60% butadiene and up to 40% styrene, up to 40% alpha-methyl styrene and up to 10% of other ethylenically unsaturated compounds copolymerizable therewith.

6. A strong, impact resistant, polycomponent, polymeric composition comprising:

| | |
|---|---|
| (A) A copolymer of 50–90% styrene, balance acrylonitrile | 45–90%, based upon the total weight of constituents (A), (B) and (C). |
| (B) A graft copolymer of a styrene-acrylonitrile-type mixture of monomers upon a butadiene rubber | 10–90%, based upon the weight of constituents (B) and (C). |
| (C) A butadiene rubber | 10–90%, based upon the weight of constituents (B) and (C). |

said graft copolymer (B) being a graft produced by subjecting to polymerizing conditions, in the presence of an already polymerized butadiene rubber substrate, a mixture of monomers containing 50–90% of a compound selected from the group consisting of styrene and alphamethyl styrene and 10–50% of a compound selected from the group consisting of acrylonitrile and methacrylonitrile, these last two percentages being on the basis of the weight of the monomer mixture, and the substrate of the graft being a butadiene rubber as specified hereinbelow for the constituent (C), the weight of said monomers grafted into said graft copolymer constituting from 10 to 80% of the weight of the graft copolymer, and said butadiene rubber (C) being selected from the group consisting of homopolymers of butadiene and copolymers thereof containing at least 60% butadiene and up to 40% styrene, up to 40% alpha-methyl styrene and up to 10% of other ethylenically unsaturated compounds copolymerizable therewith.

7. A strong, impact resistant, polycomponent, polymeric composition comprising:

| | |
|---|---|
| (A) A copolymer of 50–90% styrene, balance acrylonitrile | 55–85%, based upon the total weight of constituents (A), (B) and (C). |
| (B) A graft copolymer of a styrene-acrylonitrile-type mixture of monomers upon a butadiene rubber | 10–90%, based upon the weight of constituents (B) and (C). |
| (C) A butadiene rubber | 10–90%, based upon the weight of constituents (B) and (C). |

said graft copolymer (B) being a graft produced by subjecting to polymerizing conditions, in the presence of an already polymerized butadiene rubber substrate, a mixture of monomers containing 50–90% of a compound selected from the group consisting of styrene and alphamethyl styrene, and 10–50% of a compound selected from the group consisting of acrylonitrile and methacrylonitrile, these last two percentages being on the basis of the weight of the monomer mixture, and the substrate of the graft being a butadiene rubber as specified hereinbelow for the constituent (C), the weight of said monomers grafted into said graft copolymer constituting from 10 to 80% of the weight of the graft copolymer, and said butadiene rubber (C) being selected from the group consisting of homopolymers of butadiene and copolymers thereof containing at least 60% butadiene and up to 40% styrene, up to 40% alpha-methyl styrene and up to 10% of other ethylenically unsaturated compounds copolymerizable therewith.

8. A strong, impact resistant, polycomponent, polymeric composition comprising:

| | |
|---|---|
| (A) A copolymer of 50–90% styrene, balance acrylonitrile | 75–95% based on the total weight of constituents (A), (B) and (C). |
| (B) A graft copolymer of a styrene-acrylonitrile-type mixture of monomers upon a butadiene rubber | 10–90%, based upon the weight of constituents (B) and (C). |
| (C) A butadiene rubber | 10–90%, based upon the weight of constituents (B) and (C). |

said graft copolymer (B) being a graft produced by subjecting to polymerizing conditions, in the presence of an already polymerized butadiene rubber substrate, a mixture of monomers containing 50–90% of a compound selected from the group consisting of styrene and alphamethyl styrene, and 10–50% of a compound selected from the group consisting of acrylonitrile and methacrylonitrile, these last two percentages being on the basis of the weight of the monomer mixture, and the substrate of the graft being a butadiene rubber as specified hereinbelow for the constituent (C), the weight of said monomers grafted into said graft copolymer constituting from 10 to 80% of the weight of the graft copolymer, and said butadiene rubber (C) being selected from the group consisting of homopolymers of butadiene and copolymers thereof containing at least 60% butadiene and up to 40% styrene, up to 40% alpha-methyl styrene and up to 10% of other ethylenically unsaturated compounds copolymerizable therewith.

9. A strong, impact resistant, polycomponent, polymeric composition comprising:

| | Percent |
|---|---|
| (A) A copolymer of 78% styrene, balance acrylonitrile | 65 |
| (B) A graft copolymer produced by subjecting to polymerizing conditions, in the presence of an already polymerized polybutadiene substrate, a mixture of 78% styrene, balance acrylonitrile, the grafted comonomers constituting 40% of the graft copolymer | 20 |
| and | |
| (C) A copolymer of 90% butadiene, balance styrene | 15 |

10. A strong, impact resistant, polycomponent, polymeric composition comprising:

| | Percent |
|---|---|
| (A) A copolymer of 78% styrene, balance acrylonitrile | 65 |
| (B) A graft copolymer produced by subjecting to polymerizing conditions, in the presence of an already polymerized polybutadiene substrate, a mixture of 61% styrene, balance methacrylonitrile, the grafted monomers constituting 40% of the weight of the graft copolymer | 20 |
| and | |
| (C) A copolymer of 90% butadiene, balance styrene | 15 |

11. A strong, impact resistant, polycomponent, polymeric composition comprising:

| | Percent |
|---|---|
| (A) A copolymer of 61% styrene, balance methacrylonitrile | 65 |
| (B) A graft copolymer produced by subjecting to polymerizing conditions, in the presence of an already polymerized polybutadiene substrate, a mixture of 69% of alpha-methyl styrene, balance methacrylonitrile, the grafted comonomers constituting 40% of the graft copolymer | 20 |
| and | |
| (C) A copolymer of 90% butadiene, balance styrene | 15 |

12. A strong, impact resistant, polycomponent, polymeric composition comprising:

| | Percent |
|---|---|
| (A) A copolymer of 64% alpha-methyl styrene, balance acrylonitrile | 65 |
| (B) A graft copolymer produced by subjecting to polymerizing conditions, in the presence of an already prepared substrate copolymer of 75% butadiene, balance styrene, a mixture of 78% styrene, balance acrylonitrile, the grafted comonomers constituting 40% by weight of the graft copolymer | 20 |
| and | |
| (C) A copolymer of 75% butadiene, balance styrene | 15 |

13. A strong, impact resistant, polycomponent, polymeric composition comprising:

| | Percent |
|---|---|
| (A) A copolymer of 50–90% styrene, balance acrylonitrile | 85 |
| (B) A graft copolymer produced by subjecting to polymerizing conditions, in the presence of an already polymerized diene rubber substrate as defined for constituent (C), a mixture of 50–90% of styrene, balance acrylonitrile the grafted comonomers constituting 10–80% by weight of the graft copolymer | 9 |
| and | |
| (C) A rubber selected from the group consisting of homopolymers of butadiene and copolymers thereof containing at least 60% of butadiene and up to 40% of styrene, up to 40% alpha-methyl styrene and up to 10% of other compounds copolymerizable therewith | 6 |

14. A strong, impact resistant, polycomponent, polymeric composition comprising:

| | Percent |
|---|---|
| (A) A copolymer of 78% styrene, balance acrylonitrile | 85 |
| (B) A graft copolymer produced by subjecting to polymerizing conditions, in the presence of an already polymerized polybutadiene substrate, a mixture of 78% styrene, balance acrylonitrile, the grafted comonomers constituting 40% of the weight of the graft copolymer | 9 |
| and | |
| (C) A copolymer of 90% butadiene, balance styrene | 6 |

References Cited in the file of this patent

UNITED STATES PATENTS 2,550,139 Daly ------------------ Apr. 24, 1951

OTHER REFERENCES

Journal Polymer Science, vol. 8, page 260 (1952).